US012597148B2

(12) United States Patent
Werlberger et al.

(10) Patent No.: US 12,597,148 B2
(45) Date of Patent: Apr. 7, 2026

(54) FRAMEWORK FOR EFFICIENT GENERATION AND STREAMING OF AUGMENTED FRAMES OF COLORS AND DEPTH DATA

(71) Applicant: Holo-Light GmbH, Innsbruck (AT)

(72) Inventors: Alexander Werlberger, Haimhausen (DE); Philipp Landgraf, Altenmarkt a.d. Alz (DE); Krzysztof Lesiak, Aschheim (DE)

(73) Assignee: Holo-Light GmbH, Innsbruck (AT)

( * ) Notice: Subject to any disclaimer, the term of this patent is extended or adjusted under 35 U.S.C. 154(b) by 341 days.

(21) Appl. No.: 18/192,025

(22) Filed: Mar. 29, 2023

(65) Prior Publication Data

US 2023/0326050 A1 Oct. 12, 2023

(30) Foreign Application Priority Data

Mar. 30, 2022 (EP) ..................................... 22165555

(51) Int. Cl.
*G06K 9/00* (2022.01)
*G06T 7/50* (2017.01)
(Continued)

(52) U.S. Cl.
CPC .................. *G06T 7/50* (2017.01); *G06T 7/90* (2017.01); *G06T 9/00* (2013.01); *G06V 10/56* (2022.01); *G06T 2207/10024* (2013.01)

(58) Field of Classification Search
CPC .. G06T 9/00; G06T 9/005; G06T 7/50; G06T 7/90; G06T 2207/10024; G06V 10/56; G06V 10/16; G06V 10/40; H04N 19/597; H04N 19/46; H04N 9/8042; H04N 9/8081; H04N 11/02
See application file for complete search history.

(56) References Cited

U.S. PATENT DOCUMENTS 5,408,542 A * 4/1995 Callahan ............. G06F 12/0875
382/191
2013/0050415 A1 2/2013 Wang
(Continued)

OTHER PUBLICATIONS

EP Application No. 22165555.8, Extended European Search Report mailed Aug. 31, 2022, 10 pages.

*Primary Examiner* — Duy M Dang
(74) *Attorney, Agent, or Firm* — Gilliam IP PLLC

(57) ABSTRACT

A method of generating an augmented frame comprising depth information is described. The method comprises:

generating color information associated with pixels of a first frame of an image;

generating depth information, wherein the depth information comprises a distance of each of the pixels of the image from a reference point;

generating the augmented frame based on the color information and based on the depth information, wherein the augmented frame comprises a color frame portion and a frame extension attached to the color frame portion; and encoding the augmented frame with an encoder to generate an encoded frame.

The color frame portion has an equivalent number of bits as the first frame and comprises color information associated with pixels of the image. The frame extension has a second bit length equivalent to the frame, and comprises depth information associated with the pixels of the image.

20 Claims, 3 Drawing Sheets

(51) Int. Cl.
    *G06T 7/90*           (2017.01)
    *G06T 9/00*           (2006.01)
    *G06V 10/56*        (2022.01)

(56)              References Cited

U.S. PATENT DOCUMENTS

2014/0241418 A1 *  8/2014  Garbas .................. H04N 19/11
                                          375/240.02
2014/0368610 A1   12/2014  Grangetto et al.
2022/0020112 A1   1/2022  Wen

* cited by examiner

Fig. 2

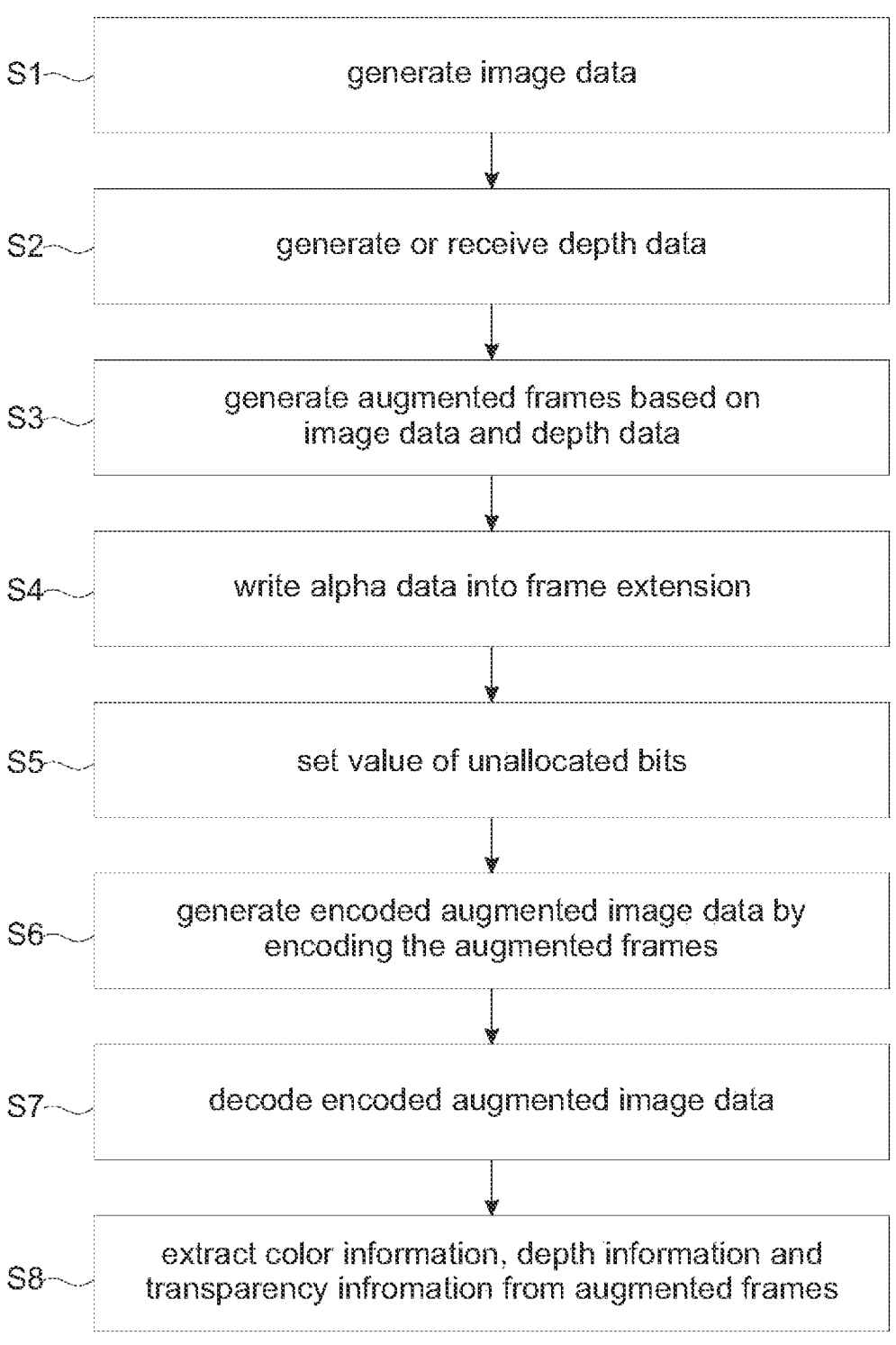

S1 — generate image data

S2 — generate or receive depth data

S3 — generate augmented frames based on image data and depth data

S4 — write alpha data into frame extension

S5 — set value of unallocated bits

S6 — generate encoded augmented image data by encoding the augmented frames

S7 — decode encoded augmented image data

S8 — extract color information, depth information and transparency infromation from augmented frames

FRAMEWORK FOR EFFICIENT GENERATION AND STREAMING OF AUGMENTED FRAMES OF COLORS AND DEPTH DATA

FIELD OF THE DISCLOSURE

Embodiments of the present disclosure generally relate to a computer-implemented method of generating augmented image data comprising depth information. Embodiments of the present disclosure further relate to a computer-implemented streaming method of streaming augmented image data comprising depth information, to an image streaming system, and to an augmented image data stream.

BACKGROUND

Image or video streaming is becoming ever more important for a plurality of different applications. Usually, image data comprising information on the color values of the individual pixels of the respective image is encoded and transmitted to a client-side device. The client-side device decodes the encoded image data, and the color values of the pixels can be extracted from the decoded image data.

For certain applications, it is beneficial to transmit not only the color information to the client-device, but also depth information that is associated with a distance of the respective pixel from a certain reference point, e.g. from a virtual camera. For example, the depth information is useful in extended reality (XR) applications in order to enhance the quality of an image reprojection performed by an XR device.

However, the additional depth information transmitted has to be synchronized with the color information, which introduces additional technical complexity.

Moreover, the data volume of the data to be transmitted is increased significantly due to the additional depth information, particularly because known codecs cannot process depth information correctly.

Thus, there is a need for a method of generating image data, an image streaming method, and an image streaming system that overcome these problems.

SUMMARY

Embodiments of the present disclosure provide a computer-implemented method of generating augmented image data comprising depth information. The method comprises:
  generating or receiving image data, wherein the image data comprises at least one frame having a first predetermined bit length, wherein the at least one frame comprises color information associated with pixels of at least one image;
  generating or receiving depth data, wherein the depth data comprises depth information associated with the pixels of the at least one image; and
  generating at least one augmented frame based on the image data and based on the depth data, wherein the at least one augmented frame comprises a color frame portion and a frame extension attached to the color frame portion.

The computer-implemented method according to the present disclosure is based on the idea to attach the additional information that is to be transmitted, namely the depth information associated with the pixels of the at least one image, to the frame describing the colors of the respective image.

The at least one resulting augmented frame comprises both the color information associated with the at least one image and the depth information (also called "z-buffer") associated with the at least one image. Thus, when the at least one augmented frame is transmitted, the color information and the depth information are inherently synchronized with each other, as the color information and the depth information are comprised in a single frame, namely the augmented frame.

Thus, the obtained augmented image data, i.e. the at least one augmented frame, comprises both the color information associated with the at least one image and the depth information associated with the at least one image.

In other words, it is not necessary to synchronize two data stream transmitting the color information and the depth information, respectively.

Moreover, it has turned out that common encoders, particularly image or video encoders using the H.264/MPEG-4 AVC standard, can efficiently encode the at least one augmented frame, such that the overall data size that is to be transmitted is significantly reduced.

This is due to the fact that the at least one augmented frame looks like a usual image to the decoder, but with an increased number of pixels compared to the at least one image described by the at least one frame.

The at least one augmented frame may be generated in plurality of different ways.

The frame extension may be attached, particularly directly attached, to the at least one frame. Then, the depth data may be written into the frame extension, thereby obtaining the at least one augmented frame.

Alternatively, the depth data may be written into the frame extension first, and the resulting frame extension comprising the depth information may be attached, particularly directly attached, to the at least one frame, thereby obtaining the at least one augmented frame.

Alternatively, at least one new frame having a bit length corresponding to the sum of the first predetermined bit length and the second predetermined bit length may be generated. The image data comprised in the at least one frame and the depth data may be written into the new frame, thereby obtaining the at least one augmented frame.

The depth information may be associated with a distance of the pixels of the image from a certain reference point, e.g. from a virtual camera.

According to an aspect of the present disclosure, the first predetermined bit length is equal to the second predetermined bit length. Thus, the at least one augmented frame has a bit length that is equal to two times the first predetermined bit length. Thus, to an encoder, the at least one augmented frame looks like an image having twice the number of pixels of the at least one image described by the at least one frame. It has turned out that common encoders reduce the data volume particularly efficiently if the first predetermined bit length is equal to the second predetermined bit length.

In an embodiment of the present disclosure, alpha data is generated or received, wherein the alpha data comprises transparency information associated with the pixels of the at least one image, and wherein the alpha data is written into the frame extension. Thus, additional information associated with the at least one image described by the at least one frame is transmitted together with the color information and the depth information.

Thus, when the at least one augmented frame is transmitted, the color information, the depth information, and the transparency information are inherently synchronized, as the color information, the depth information, and the transparency information are comprised in a single frame, namely the augmented frame.

Moreover, it has turned out that common encoders efficiently reduce the data volume associated with the at least one augmented frame.

In a further embodiment of the present disclosure, the at least one augmented frame is associated with at least one XR image. Accordingly, the color information associated with the at least one XR image can be transmitted together with the depth information associated with the at least one XR image and, optionally, together with transparency information associated with the at least one XR image. The additionally transmitted depth information may be used by an XR device in order to reproject the at least one XR image, such that the at least one XR image is correctly displayed. Particularly, it is ensured that stable, world-anchored holograms are displayed by the XR device.

Therein and in the following, the term "XR image" is understood to denote an extended reality (XR) image, i.e. an augmented reality (AR) image, a mixed reality (MR) image, and/or a virtual reality (VR) image.

In the case of augmented reality or mixed reality, the at least one XR image corresponds to at least one virtual image that is superimposed over reality.

In the case of virtual reality, the at least one XR image may correspond to at least one purely virtual image.

According to a further aspect of the present disclosure, unallocated bits of the frame extension are set to zero. Therein and in the following, the term "unallocated bits" is understood to denote bits of the frame extension that do not comprise any depth information or transparency information associated with the at least one image.

It has turned out that setting the unallocated bits to zero is particularly suitable for subsequent processing by common encoders. More precisely, common encoders correctly process the at least one augmented frame and efficiently reduce the data volume if the unallocated bits are set to zero.

However, in principle, it is also possible to assign other values to the unallocated bits. For example, all unallocated bits may be set to "1".

A plurality of augmented frames corresponding to different images may be generated, particularly wherein the different images are a series of consecutive images. Particularly, each augmented frame corresponds to exactly one of the different images.

The series of consecutive images may correspond to an image stream or a video stream, particularly to an XR image stream or an XR video stream that is to be displayed on an electronic device.

In an embodiment of the present disclosure, the at least one augmented frame is encoded by means of an encoder. As already mentioned above, the at least one augmented frame obtained by means of the method according to the present disclosure can be efficiently processed by means of any suitable encoder known in the state of the art. Thus, the encoder may be any encoder known in the state of the art that is suitable for a file type of the augmented image data.

The encoder may be a video encoder. The encoder may be any video encoder known in the state of the art that is suitable for a file type of the augmented image data, e.g. as an encoder using the H.264/MPEG-4 AVC standard.

Embodiments of the present disclosure further provide a computer-implemented streaming method of streaming augmented image data comprising depth information. The streaming method comprises the steps of:

generating augmented image data by means of a computer-implemented method described above;

encoding the augmented image data by means of an encoder, thereby obtaining encoded augmented image data;

transmitting the encoded augmented image data to an electronic device, wherein the electronic device comprises a decoder; and decoding the encoded augmented image data by means of the decoder, thereby recovering the augmented image data.

In other words, the at least one augmented frame is generated as described above. The at least one augmented frame is encoded by means of an encoder, thereby obtaining the encoded augmented image data. The encoded augmented image data is transmitted to the electronic device. The encoded augmented image data is decoded by means of the decoder, thereby recovering the at least one augmented frame.

As already mentioned above, the at least one augmented frame obtained by means of the method according to the present disclosure can be efficiently processed by means of any suitable encoder known in the state of the art. Thus, the data volume associated with the augmented image data stream is efficiently reduced by the encoder.

Moreover, when the encoded augmented frame is transmitted, the color information and the depth information are inherently synchronized with each other, as the color information and the depth information are comprised in a single frame, namely the at least one augmented frame.

In other words, it is not necessary to synchronize two data stream transmitting the color information and the depth information, respectively.

Regarding the further advantages and properties of the computer-implemented streaming method, reference is made to the explanations with respect to the computer-implemented method for generating augmented image data comprising depth information described above, which also hold for the computer-implemented streaming method and vice versa.

According to an aspect of the present disclosure, the color information associated with the pixels of the at least one image is extracted from the color frame portion. Additionally or alternatively, the depth information is extracted from the frame extension. By decoding the encoded augmented image data, the augmented image data comprising the at least one augmented frame is recovered. The electronic device thus simply can read the color information from the color frame portion of the at least one recovered augmented frame, and the depth information from the frame extension of the at least one recovered augmented frame.

Embodiments of the present disclosure further provide an image streaming system. The image streaming system comprises a first electronic device, wherein the first electronic device is configured to perform the computer-implemented method for generating augmented image data comprising depth information described above.

Regarding the advantages and further properties of the image streaming system, reference is made to the explanations with respect to the computer-implemented method for generating augmented image data comprising depth information and with respect to the computer-implemented streaming method described above, which also hold for the image streaming system and vice versa.

In general, the first electronic device may be any type of electronic computing device that is configured to have the described functionality.

Particularly, the first electronic device is a server. The server may have suitable hardware and suitable software being executed on the hardware that is configured to perform the described functionality.

As another example, the first electronic device may be a personal computer, as a laptop, as a notebook, as a MAC, as a tablet, as a smartphone, or as any other type of smart device.

According to an aspect of the present disclosure, the image streaming system further comprises a second electronic device. The first electronic device and the second electronic device are connected in a signal-transmitting manner. The first electronic device comprises an encoder, wherein the encoder is configured to encode the augmented image data. The second electronic device comprises a decoder, wherein the decoder is configured to decode the encoded augmented image data, thereby recovering the augmented image data. Thus, the image streaming system may be configured to perform the computer-implemented streaming method described above.

Regarding the further advantages and further properties of the image streaming system, reference is made to the explanations with respect to the computer-implemented method for generating augmented image data comprising depth information and with respect to the computer-implemented streaming method described above, which also hold for the image streaming system and vice versa.

Particularly, the image streaming system may be a video streaming system.

According to a further aspect of the present disclosure, the second electronic device is an XR device.

Therein and in the following, the term "XR device" is understood to denote an electronic device that is configured to display an extended reality (XR) image, i.e. an augmented reality (AR) image, a mixed reality (MR) image, and/or a virtual reality (VR) image.

For example, the second electronic device may be configured as a head-mounted display, particularly as an electronic wearable having the shape of glasses.

However, it is to be understood that the second electronic device may be any other XR-capable electronic device, e.g. as a smartphone or as a tablet.

Particularly, the second electronic device is configured to reproject the XR image based on the depth information comprised in the at least one augmented frame.

Embodiments of the present disclosure further provide an augmented image data stream. The augmented image data stream comprises at least one augmented frame, wherein the at least one augmented frame comprises a color frame portion and a frame extension attached to the color frame portion. The color frame portion has a first predetermined bit length. The color frame portion comprises color information associated with pixels of an image. The frame extension has a second predetermined bit length. The frame extension comprises depth information associated with the pixels of the image.

The augmented image data stream is obtainable by means of a computer-implemented method for generating augmented image data comprising depth information described above.

Regarding the advantages and further properties of the augmented image data stream, reference is made to the explanations with respect to the computer-implemented method for generating augmented image data comprising depth information and with respect to the computer-implemented streaming method described above, which also hold for the augmented image data stream and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 2 shows a flow chart of a computer-implemented streaming method for streaming augmented image data according to the present disclosure;

DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

For the purposes of the present disclosure, the phrase "at least one of A, B, and C", for example, means (A), (B), (C), (A and B), (A and C), (B and C), or (A, B, and C), including all further possible permutations when more than three elements are listed. In other words, the term "at least one of A and B" generally means "A and/or B", namely "A" alone, "B" alone or "A and B".

Figure 1:
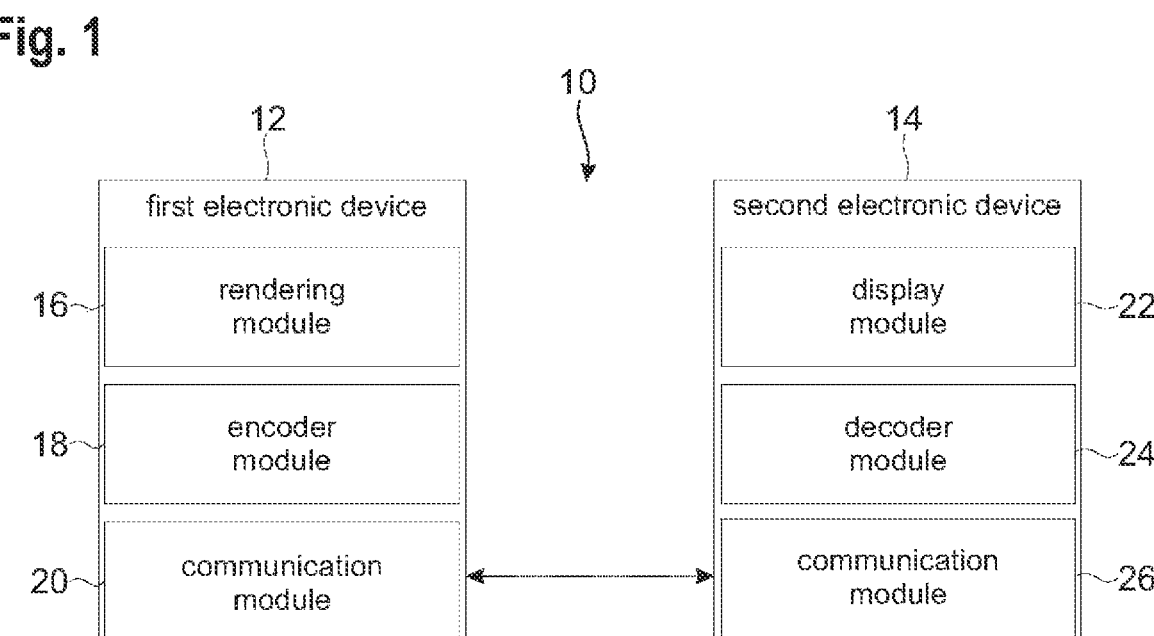
FIG. 1 schematically shows an image streaming system according to the present disclosure.

FIG. 1 schematically shows a block diagram of an image streaming system 10 comprising a first electronic device 12 and a second electronic device 14.

The first electronic device 12 comprises a rendering module 16, an encoder module 18, and a communication module 20.

Therein and in the following, the terms "circuit" and "module" are each understood to describe suitable hardware, suitable software, or a combination of hardware and software that is configured to have a certain functionality.

The hardware may, inter alia, comprise a CPU, a GPU, an FPGA, an ASIC, or other types of electronic circuitry.

For example, the first electronic device 12 may be a server. As another example, the first electronic device 12 may be a personal computer, as a laptop, as a notebook, as a MAC, as a tablet, as a smartphone, or as any other type of smart device.

The second electronic device 14 comprises a display module 22, a decoder module 24, and a communication module 26.

In general, the second electronic device 14 is any electronic device that is configured to receive an image stream and/or a video stream, and to display the received image stream and/or video stream on a display of the display module 22.

Particularly, the second electronic device 14 may be an XR device.

Therein and in the following, the term "XR device" is understood to denote an electronic device that is configured to display an extended reality (XR) image, i.e. an augmented reality (AR) image, a mixed reality (MR) image, and/or a virtual reality (VR) image.

For example, the second electronic device 14 may be configured as a head-mounted display, particularly as an electronic wearable having the shape of glasses.

However, it is to be understood that the second electronic device 14 may be any other XR-capable electronic device, e.g. as a smartphone or as a tablet.

The first electronic device 12 and the second electronic device 14 are connected with each other in a signal-transmitting manner.

Therein and in the following, the term "connected in a signal transmitting manner" is understood to denote a cable-based or wireless connection that is configured to transmit signals between the respective devices or components.

More precisely, the communication module 20 of the first electronic device 12 and the communication module 26 of the second electronic device 14 are configured to communicate with each other, such that data can be exchanged between the electronic devices 12, 14, as will be described in more detail below.

For example, the communication circuits 20, 26 may be configured to communicate with each other via WLAN, LAN, Ethernet, 4G, 5G or any other suitable type of connection.

The image streaming system 10 is configured to perform a computer-implemented streaming method for streaming augmented image data comprising depth information. The computer-implemented streaming method is described in the following with reference to FIG. 2.

Image data is generated by means of the rendering module 16, wherein the image data comprises at least one frame having a first predetermined bit length (step S1). The at least one frame comprises color information associated with pixels of at least one image. In other words, each generated frame comprises the color information for each pixel of one image associated with the respective frame. While it is possible that only a single image is streamed, usually a series of images, i.e. a video is streamed. Thus, without restriction of generality, it is assumed in the following that a plurality of frames corresponding to a plurality of consecutive images is generated.

Depth data associated with the plurality of images is received or generated by means of the rendering module 16 (step S2). The depth data comprises depth information associated with the pixels of the plurality of images. More precisely, for each of the plurality of images, the depth data comprises the depth information for each pixel of the respective image or for at least for a certain subset of the pixels of the respective image. The depth information may be associated with a distance of the pixels of the respective image from a certain reference point, e.g. from a virtual camera. Particularly, the depth information may be associated with a distance of the pixels of the respective image from the second electronic device 14.

A plurality of augmented frames corresponding to the plurality of frames is generated by means of the rendering module 16, wherein the plurality of augmented frames is generated based on the image data and based on the depth data (step S3). More precisely, for each generated frame a corresponding augmented frame may be generated.

Figure 3:
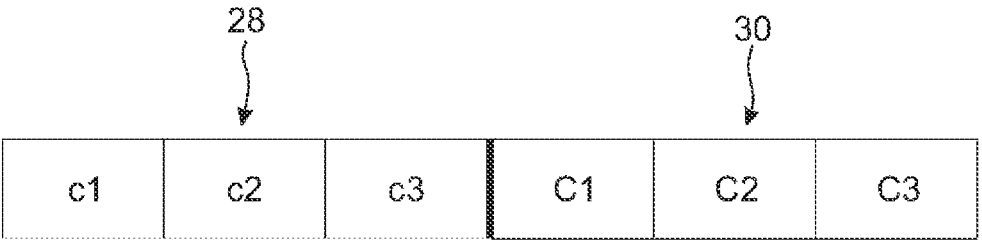
FIG. 3 schematically shows an augmented frame.

As is illustrated in FIG. 3, each generated augmented frame comprises a color frame portion 28 and a frame extension 30. For illustrative purposes, the color frame portion 28 and the frame extension 30 are separated by a thick line in FIG. 3. The color frame portion 28 comprises the color information associated with the pixels of the corresponding image. A bit length of the color frame portion 28 is equal to the first predetermined bit length. In other words, the bit length of the color frame portion 28 matches the bit length of the frame describing the corresponding image. As is further qualitatively illustrated in FIG. 3, the color frame portion 28 may comprise a plurality of color channels. In the particular example shown in FIG. 3, the color frame portion 28 comprises three color channels c1, c2, and c3, which may correspond to the RGB values of the pixels of the respective image. Of course, any other color-coding scheme may be used. For example, the color frame portion 28 may comprise four color channels corresponding to the CMYK values of the pixels of the respective image.

The frame extension 30 comprises the depth information associated with the pixels of the corresponding image, namely the depth information associated with all pixels of the corresponding image or the depth information associated with a subset of the pixels of the corresponding image. The frame extension 30 has a second predetermined bit length, such that the overall bit length of the augmented frame corresponds to the sum of the first predetermined bit length and the second predetermined bit length. Preferably, the second predetermined bit length is equal to the first predetermined bit length, such that the overall bit length of the augmented frame corresponds to twice the first predetermined bit length. Without restriction of generality, this case is described in the following.

In fact, the at least one augmented frame may be generated in plurality of different ways. The frame extension 30 may be attached, particularly directly attached, to the at least one frame. Then, the depth data may be written into the frame extension 30, thereby obtaining the at least one augmented frame. Alternatively, the depth data may be written into the frame extension 30 first, and the resulting frame extension comprising the depth information may be attached, particularly directly attached, to the at least one frame, thereby obtaining the at least one augmented frame. Alternatively, at least one new frame having a bit length corresponding to the sum of the first predetermined bit length and the second predetermined bit length may be generated. The image data comprised in the frame and the depth data may be written into the new frame, thereby obtaining the at least one augmented frame.

To an encoder, the augmented frame looks like a frame describing a picture having twice the amount of pixels. Accordingly, the bits of the frame extension 30 can be grouped into three "color" channels C1, C2, and C3 that would be associated with the color values of the additional (hypothetical) pixels. Preferably, the depth information is written into the frame extension 30 such that the "color" channels C1, C2, and C3 are consecutively filled with the depth information. It has turned out that encoders process the augmented frame particularly efficiently if the depth information is written into the frame extension 30 in this way. In other words, the first "color" channel C1 is filled with the depth information first. If the first "color" channel C1 is full, then the remaining depth information is written into the second "color" channel C2, etc. However, it is also possible that the depth information is distributed over the "color" channels C1, C2, and C3.

Optionally, alpha data is generated or received by means of the rendering module 16, and the alpha data is written into the frame extension 30 (step S4). The alpha data comprises transparency information associated with the pixels of the images. The alpha data may be written into the frame extension 30 analogously to the explanations given above with respect to the depth information.

A value of unallocated bits of the frame extension 30 is set to a predefined value (step S5). Therein and in the following, the term "unallocated bits" is understood to denote bits of the frame extension 30 that do not comprise any depth information or transparency information associated with the corresponding image. Preferably, the unallocated bits of the frame extension 30 are set to zero. However, in principle, it is also possible to assign other values to the unallocated bits. For example, the unallocated bits may all be set to "1".

The augmented frames are encoded by means of the encoder module 18, thereby obtaining encoded augmented image data (step S6). The encoder module 18 may employ any type of encoder known in the state of the art that is suitable for a file type of the augmented image data. Particularly, the encoder may be a video encoder, for example an encoder using the H.264/MPEG-4 AVC standard. The encoded augmented image data is transmitted to the second electronic device by means of the communication modules 20, 26.

The encoded augmented image data is decoded by means of the decoder module 24, thereby recovering the augmented image data comprising the augmented frames (step S7). The decoder module 24 may employ any type of decoder known in the state of the art that is compatible with the encoder employed by the encoder module 18 of the first electronic device 12.

The color information, the depth information and, optionally, the transparency information are extracted from the augmented frames by means of the display module 22 (step S8). More precisely, the color information associated with the pixels of the respective image is extracted from the color frame portion 28 of the respective augmented frame. The depth information and the transparency information associated with the pixels of the respective image are extracted from the frame extension 30 of the respective augmented frame. The images corresponding to the augmented frames may be displayed on a display of the display module 22 based on the extracted color information, based on the extracted depth information and, optionally, based on the extracted transparency information. For example, the display module 22 may adapt certain properties of the images based on the extracted depth information and, optionally, based on the extracted transparency information, such that the images are correctly displayed. In fact, positions of one, several or all pixels of the images may be adapted based on the extracted depth information. In other words, the display module 22 may reproject the images based on the extracted depth information and, optionally, based on the extracted transparency information, such that the images are correctly displayed. Alternatively or additionally, color values of one, several or all pixels of the images may be adapted based on the extracted depth information and/or based on the extracted transparency information.

The explanations given above apply to arbitrary image and/or video streaming systems. However, the depth information transmitted together with the color information is particularly useful for XR image streaming or XR video streaming.

Figure 4:
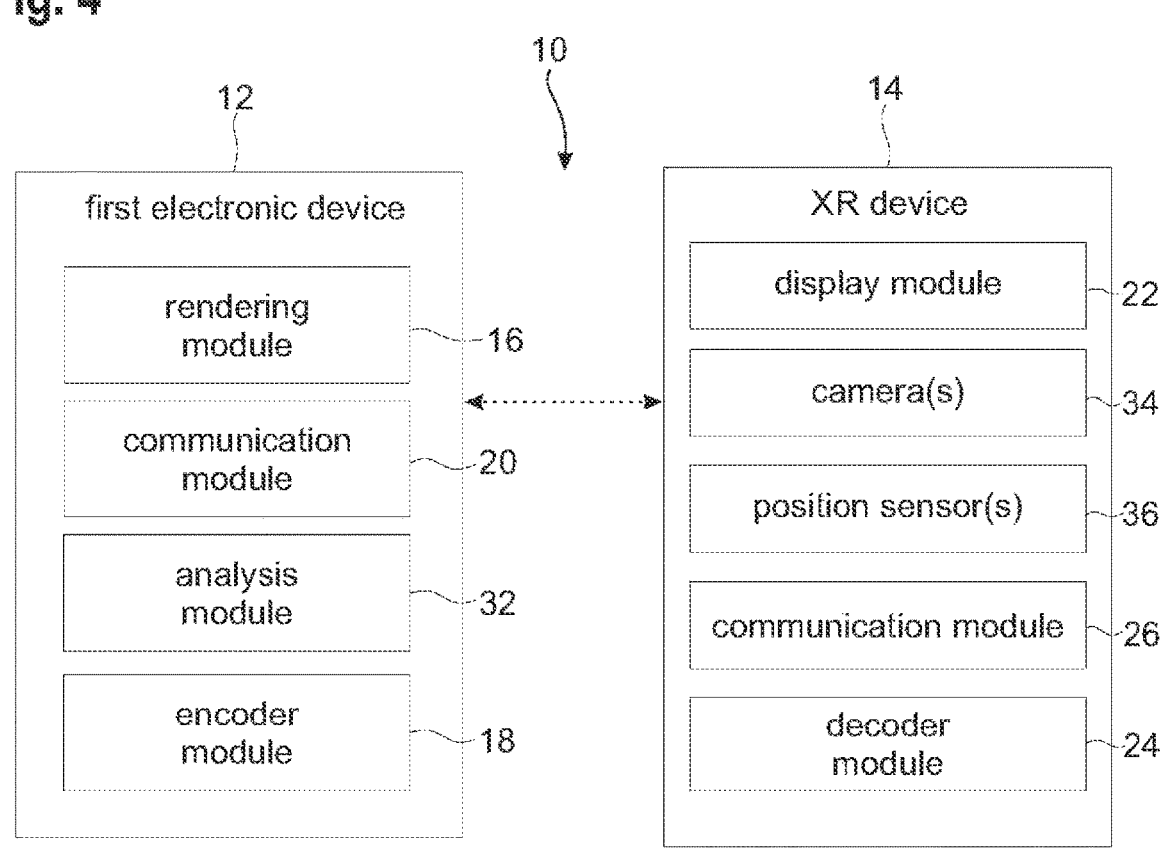
FIG. 4 shows a further exemplary embodiment of the image streaming system of FIG. 1.

FIG. 4 shows an exemplary embodiment of the image streaming system 10, wherein the image streaming system 10 is an XR image streaming system. In general, the image streaming system 10 shown in FIG. 4 allows a user to observe and/or interact with virtual objects, particularly virtual 3D objects. Accordingly, the second electronic device 14 or rather the display module 22 is configured display at least one XR image, such that the virtual object is displayed to the user. If the image streaming system 10 is an AR image streaming system or an MR image streaming system, these virtual objects are embedded into a real environment of the user. If the image streaming system 10 is a VR image streaming system, the images displayed by the display module 22 may be completely virtual.

In the following, only the differences compared to the embodiment shown in FIG. 1 are explained. The first electronic device 12 comprises an analysis module 32. In fact, the analysis module 32 may be integrated into the first electronic device 12 or into the second electronic device 14. The second electronic device 14 may be an XR device, for example as a head-mounted display, as a smartphone, or as a tablet. The second electronic device 14 may comprise at least one camera 34, and at least one position sensor 36. The at least one camera 34 is configured to capture images of an environment of the second electronic device 14, particularly of an environment in front of the second electronic device 14. Particularly, the at least one camera 34 may be a stereo camera. Alternatively or additionally, the second electronic device 14 may comprise several cameras with overlapping field of view. Thus, depth-information on images taken by the at least one camera 34 can be determined based on images taken by the at least one camera 34. The at least one position sensor 36 is configured to determine a position, i.e. a location and/or orientation of the second electronic device 14. For example, the at least one position sensor 36 may be a gyroscope, as an acceleration sensor, as a magnetometer, as a global navigation satellite system (GNSS) device, and/or as any other suitable type of position sensor.

In general, the image streaming system 10 shown in FIG. 4 is also configured to perform the computer-implemented streaming method described above. However, the following modifications to the individual steps may be applied:

In step S1, the image data may be generated based on momentary position data, wherein the momentary position data is associated with a momentary position of the second electronic device 14. The momentary position data may be determined by means of the at least one position sensor 36 of the second electronic device 14. Alternatively or additionally, the momentary position data may be determined by means of at least one external camera, i.e. at least one camera that is not integrated into the second electronic device 14. The at least one external camera may be connected to the analysis module 32, wherein the analysis module 32 is configured to determine the momentary position data based on images of the second electronic device 14 captured by means of the at least one external camera 34. Optionally, the second electronic device 14 may comprise one or several light-emitting elements, particularly one or several LEDs. The analysis module 32 may determine the momentary position data based on images of the one or several light-emitting elements captured by means of the at least one external camera, particularly via triangulation. Further, it is also conceivable that the analysis module 32 may determine the momentary position data based on images captured by means of the at least one camera 34. The momentary position data is transmitted to the rendering module 16 via the communication modules 20, 26.

In step S2, depth information on images taken by the at least one camera 34 may be determined by means of the analysis module 32 based on the images taken by the at least one camera 34. The depth information may be transmitted to the rendering module 16 via the communication modules 20, 26. The depth data associated with the pixels of the at least one image generated by the rendering module 16 may be generated by means of the rendering module 16 based on the depth information received.

Steps S3 to S8 may be performed as described above.

Updated position data may be determined, wherein the updated position data is associated with a position of the second electronic device 14 at the time at which the at least one XR image is to be displayed on the second electronic device 14. The updated position data may be determined by means of the at least one position sensor 36 or by any of the other techniques described above.

The display module 22 may reproject the at least one XR image based on the momentary position data, based on the updated position data, and based on the depth information extracted from the augmented image data, thereby obtaining at least one reprojected XR image. The at least one reprojected XR image corresponds to the at least one XR image to be displayed on the second electronic device 14, which is shifted appropriately such that the at least one XR image is correctly displayed at the position corresponding to the updated position data.

Certain embodiments disclosed herein, particularly the respective module(s) and/or unit(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

The invention claimed is:

1. A computer-implemented method of generating an augmented frame comprising color and depth information, wherein the method comprises:

generating or receiving color information associated with pixels of a first frame of a first image;

generating or receiving the depth information, wherein the depth information comprises a distance of each of the pixels of the first image from a reference point;

generating the augmented frame based on the color information and based on the depth information, wherein the augmented frame comprises a color frame portion and a frame extension attached to the color frame portion; and encoding the augmented frame with an encoder to generate an encoded frame;

wherein the color frame portion has a number of bits equivalent to the number of bits in the first frame and comprises the color information associated with the pixels of the first image; and wherein the frame extension has a second number of bits equivalent to the number of bits in the first frame and comprises the depth information associated with the pixels of the first image.

2. The computer-implemented method of claim 1, wherein alpha data is generated or received, wherein the alpha data comprises transparency information associated with the pixels of the first image, and wherein the alpha data is written into the frame extension.

3. The computer-implemented method claim 1, wherein the first image is an extended reality (XR) image.

4. The computer-implemented method of claim 1, wherein unallocated bits of the frame extension are free of any depth information and alpha data and are set to a predefined value.

5. The computer-implemented method of claim 1, wherein a plurality of augmented frames corresponding to different images is generated.

6. The computer-implemented method of claim 5, wherein the different images are a series of consecutive images.

7. The computer-implemented method of claim 1, wherein the encoder is a video encoder.

8. The computer implemented method of claim 1 further comprising:

generating a plurality of augmented frames including the augmented frame based on a plurality of images that includes the first image;

encoding the plurality of augmented frames including the augmented frame with an encoder, thereby obtaining encoded augmented image data;

transmitting the encoded augmented image data to an electronic device, wherein the electronic device comprises a decoder; and decoding the encoded augmented image data using the decoder, thereby recovering the augmented image data.

9. The computer-implemented method of claim 8, wherein decoding the encoded augmented image data comprises extracting the color information associated with the pixels of the first image from the color frame portion of the corresponding augmented frame included in the plurality of augmented frames.

10. The computer-implemented method of claim 8, wherein decoding the encoded augmented image data comprises extracting the depth information associated with the pixels of the first image from the frame extension of the corresponding augmented frame included in the plurality of augmented frames.

11. The computer-implemented method of claim 1, wherein a bit length of the augmented frame is equivalent to a sum of the number of bits of the color frame portion and the number of bits of the frame extension.

12. The computer-implemented method of claim 1, wherein the encoder comprises an H.264/MPEG-4 Advanced Video Coding encoder.

13. The computer-implemented method of claim 1, wherein encoding the augmented frame comprises compressing the augmented frame with the encoder to have a number of bits equivalent to the number of bits in the first frame after compression.

14. A system comprising:

a first electronic device, wherein the first electronic device is configured to, generate or receive image data, wherein the image data comprises a first frame having a first predetermined number of bits, wherein the first frame comprises color information associated with pixels of an image;

generate or receive depth information, wherein the depth information comprises a distance of each of the pixels from a reference point;

generate an augmented frame based on the image data and based on the depth information, wherein the augmented frame comprises a color frame portion and a frame extension attached to the color frame portion; and encode the augmented frame with an encoder to generate an encoded frame;

wherein the color frame portion has a number of bits equivalent to the first predetermined number of bits comprises the color information associated with the pixels of the image; and wherein the frame extension has a number of bits equivalent to the first predetermined number of bits, and comprises the depth information associated with the pixels of the image.

15. The system of claim 14, wherein the first electronic device is a server.

16. The system of claim 14, further comprising a second electronic device connected with the first electronic device in a signal-transmitting manner, wherein the second electronic device comprises a decoder configured to decode the encoded frame thereby recovering the augmented frame.

17. The system of claim 16, wherein the second electronic device is an XR device.

18. A computer-readable memory having instructions stored thereon, the instructions executable by a processor to:

generate or receive data of an image, wherein the image data comprises a first frame having a first predetermined number of bits, wherein the first frame comprises color information associated with pixels of the image;

generate or receive depth information, wherein the depth information comprises the distance of each of the pixels of the image from a reference point;

generate an augmented frame based on the image data and based on the depth information, wherein the augmented frame comprises a color frame portion and a frame extension attached to the color frame portion; and encode the augmented frame with an encoder to generate an encoded frame;

wherein the color frame portion has a number of bits equivalent to the first predetermined number of bits and comprises the color information associated with the pixels of the image; and wherein the frame extension has a number of bits equivalent to the first predetermined number of bits and comprises the depth information associated with the pixels of the image.

19. The computer-readable memory of claim 18, wherein the instructions to generate the augmented frame comprise instructions to write the depth information consecutively into channels of the frame extension or in a distributed manner across the channels.

20. The computer-readable memory of claim 18, wherein the instructions to generate the augmented frame comprise instructions to write a predefined value into unallocated bits free of any depth information and alpha data of the frame extension after writing the depth information into the frame extension.

* * * * *